United States Patent
Bequet et al.

(10) Patent No.: US 7,113,964 B1
(45) Date of Patent: Sep. 26, 2006

(54) METHOD AND APPARATUS FOR ARCHIVING DATA IN A RELATIONAL DATABASE SYSTEM

(75) Inventors: Henry G. Bequet, Boulder, CO (US); Kenneth C. Gardner, Menlo Park, CA (US)

(73) Assignee: Iteration Software, Inc., Mountain View, CA (US)

( * ) Notice: Subject to any disclaimer, the term of this patent is extended or adjusted under 35 U.S.C. 154(b) by 576 days.

(21) Appl. No.: 10/457,833

(22) Filed: Jun. 5, 2003

(51) Int. Cl.
*G06F 17/30* (2006.01)

(52) U.S. Cl. ..................................... 707/204; 707/204
(58) Field of Classification Search ................ 707/204
See application file for complete search history.

(56) References Cited

U.S. PATENT DOCUMENTS

| | | | |
|---|---|---|---|
| 5,592,608 A | 1/1997 | Weber et al. ................ 395/161 |
| 5,615,362 A | 3/1997 | Jensen et al. ................ 395/600 |
| 5,654,726 A | 8/1997 | Mima et al. ..................... 395/2 |
| 5,754,774 A | 5/1998 | Bittinger et al. ....... 395/200.33 |
| 5,758,337 A * | 5/1998 | Hammond ..................... 707/6 |
| 5,765,164 A | 6/1998 | Prasad et al. ................ 707/104 |
| 5,781,911 A | 7/1998 | Young et al. ................ 707/201 |
| 5,784,275 A | 7/1998 | Sojoodi et al. ............. 364/191 |
| 5,809,267 A | 9/1998 | Moran et al. ................ 395/358 |
| 5,812,840 A * | 9/1998 | Shwartz ......................... 707/4 |
| 5,857,201 A | 1/1999 | Wright, Jr. et al. ......... 707/104 |
| 5,862,325 A | 1/1999 | Reed et al. ............ 395/200.31 |
| 5,864,669 A | 1/1999 | Osterman et al. ...... 395/200.33 |
| 5,898,434 A | 4/1999 | Small et al. ................ 345/348 |
| 5,926,177 A | 7/1999 | Hatanaka et al. ........... 345/340 |
| 5,930,794 A | 7/1999 | Linenbach et al. ......... 707/100 |
| 6,023,694 A | 2/2000 | Kouchi et al. ................. 707/2 |
| 6,025,844 A | 2/2000 | Parsons ...................... 345/357 |
| 6,038,558 A | 3/2000 | Powers et al. ................. 707/2 |
| 6,070,197 A | 5/2000 | Cobb et al. ................. 709/303 |
| 6,075,530 A | 6/2000 | Lucas et al. ................ 345/339 |
| 6,201,539 B1 | 3/2001 | Miller et al. ................ 345/334 |
| 6,208,990 B1 | 3/2001 | Suresh et al. ................... 707/6 |
| 6,233,578 B1 | 5/2001 | Machihara et al. ........... 707/10 |
| 6,240,444 B1 | 5/2001 | Fin et al. .................... 709/205 |
| 6,243,698 B1 | 6/2001 | Powers et al. ................. 707/2 |
| 6,243,713 B1 | 6/2001 | Nelson et al. .............. 707/104 |
| 6,256,676 B1 | 7/2001 | Taylor et al. ............... 709/246 |
| 6,269,393 B1 | 7/2001 | Yost et al. ............. 365/185.18 |
| 6,292,803 B1 | 9/2001 | Richardson et al. ........ 707/102 |
| 6,301,601 B1 | 10/2001 | Helland et al. ............. 709/101 |
| 6,317,737 B1 | 11/2001 | Gorelik et al. ................. 707/1 |

(Continued)

OTHER PUBLICATIONS

"Report of Novelty Search", PATENTEC, dated Apr. 3, 2004.

(Continued)

*Primary Examiner*—Apu Mofiz
*Assistant Examiner*—Farhan M. Syed
(74) *Attorney, Agent, or Firm*—IP Strategy Group, P.C.

(57) ABSTRACT

An arrangement for archiving data in a relational database is disclosed. The arrangement includes a first table having a first data field. A value in the first data field is updated by a Relational Database Management System (RDBMS) associated with the relational database when there is a change in the value in the first data field. The arrangement further includes a second table having a second data field represented by a lookup function. The lookup function references the first data field. The lookup function acquiring the value in the first data field for use as a value of the second data field only when a value of the second data field is required by an application program that operates on the relational database.

10 Claims, 2 Drawing Sheets

U.S. PATENT DOCUMENTS

| | | |
|---|---|---|
| 6,336,135 B1 | 1/2002 | Niblett et al. ............... 709/203 |
| 6,393,421 B1 | 5/2002 | Paglin ........................... 707/1 |
| 6,430,576 B1 | 8/2002 | Gates et al. ............... 707/201 |
| 6,449,344 B1 | 9/2002 | Goldfinger et al. ...... 379/88.17 |
| 6,467,052 B1 | 10/2002 | Kaler et al. ................... 714/37 |
| 6,480,847 B1 | 11/2002 | Linenbach et al. ......... 707/201 |
| 6,513,047 B1 | 1/2003 | Talley ....................... 707/200 |
| 6,519,568 B1 | 2/2003 | Harvey et al. ................. 705/1 |
| 6,523,046 B1 | 2/2003 | Liu et al. .................... 707/200 |
| 6,532,465 B1 | 3/2003 | Hartley et al. ................. 707/1 |
| 6,567,796 B1 | 5/2003 | Yost et al. ..................... 707/2 |
| 6,574,618 B1 | 6/2003 | Eylon et al. ................... 707/1 |
| 6,574,639 B1 | 6/2003 | Carey et al. ................... 707/4 |
| 6,591,277 B1 | 7/2003 | Spence et al. ............. 707/103 |
| 6,591,278 B1 | 7/2003 | Ernst ....................... 707/104.1 |
| 6,606,596 B1 | 8/2003 | Zirngibl et al. ............. 704/270 |
| 6,651,055 B1 | 11/2003 | Kilmer et al. ............. 701/100 |
| 6,651,142 B1 | 11/2003 | Gorelik et al. ............. 711/119 |
| 2002/0038217 A1 | 3/2002 | Young ........................... 705/1 |
| 2002/0107864 A1 | 8/2002 | Battas et al. ............... 707/101 |
| 2002/0107957 A1 | 8/2002 | Zargham et al. ............ 709/224 |
| 2002/0116362 A1 | 8/2002 | Li et al. ......................... 707/1 |
| 2002/0120765 A1 | 8/2002 | Boehmke .................... 709/231 |
| 2003/0101201 A1 | 5/2003 | Saylor et al. ............... 707/200 |
| 2003/0101223 A1 | 5/2003 | Pace et al. .................. 709/206 |

OTHER PUBLICATIONS

"Steel-Belted Radius/Enterprise Edition", Funk Software, Inc., 2004.
"Scripting Support for Web Page Printing Sample," Microsoft Corporation, 2004.
"Jabber: About: Technology Overview", Jabber Software Foundation, Dec. 12, 2003.
"Report of Novelty Search," by Patentec, dated Oct. 16, 2003.
Jan Smith, "Browser Basics: Printing", Feb. 3, 2003.
Perfetti, Christine and Jared M. Spool, "Macromedia Flash: A New Hope for Web Applications", User Interface Engineering, 2002.
Aaron Weiss, "The Document Object Model Dissected", Jupitermedia Corporation, 2002.
"Protecting the Enterprise from Rogue Protocols", Akonix Systems, Inc., 2002.
"Informatica Applications: Leverage your Enterprise Information for Better Decision Making", Informatica Corporation, 2002.
"Informatica Applications: Informatica Customer Relationship Analytics", Informatica Corporation, 2002.
"Brocade Rapidly Implements Customer and Sales Analytics", Informatica Corporation, 2002.
Howlett, Dennis and Keith Rodgers, "Delivering Value Back to the Business: A Guide to Successful Portal Selection and Implementation", TIBCO Software, 2002.
"Sametime for iSeries 2.5", Lotus Software, IBM Corporation, 2002.
"Business Intelligence Software: Engendering a Quiet Revolution in the Business Place", MicroStrategy, Dec. 20, 2002.
"Print Without Pop Up Window Using Javascript," Experts Exchange, posted Nov. 3, 2002.
"Adding Printer Capabilities," Interactivetools.Com, posted Oct. 19, 2002.
Bob Woods, "CyperGuard Secures MSN, Windows IM", Instant Messaging Planet, JupiterMedia Corporation, Oct. 3, 2002.
"Business Transformation Through End-to-End Integration", IBM, Aug. 2002.
"The Sagent Analytic Advantage", Sagent Technology Inc., May 2002.
Thomas Loo and Martin Honnen, "How Can I Print a Document That is not Currently Loaded Into a Frame or Window," Synop Software, Apr. 24, 2002.
Jake Howlett, "Further Control of Printing," Codestore, Jan. 3, 2002.
Hugh J. Watson, "Recent Developments in Data Warehousing", Communications of the Association for Information Systems, vol. 8, 2001.

"The Business Intelligence Industry's Leading Products and Services", Business Objects, 2001.
Stephen Brewster, "Windowing Systems", Glasgow Interactive Systems Group, 2001.
Stevie Cimino, "How Can I Print a Web Page in ASP?", Internet. Com Corp., posted Jul. 27, 2001.
"Express Communicator", White Paper, ACD Systems Ltd., May 2001.
"Business Rules: Powering Business and E-Business", White Paper, ILOG, May 2001.
"A Data Warehousing Tutorial", Paretoanalysts, Dec. 27, 2001.
"The Sagent Performance Story", Sagent Technology, Inc., Oct. 2001.
"Achieving Global Business Visibility with the webMethods Integration Platform", webMethods, Inc., Sep. 2001.
Bernstein, Philip A. and Erhard Rahm, "Data Warehouse Scenarios for Model Management", Microsoft Corporation, 2000.
"Implementing the RosettaNet eBusiness Standard: Automating High-tech Supply Chains using Business Ware for RosettaNet", Vitria Technology Inc., 2000.
Wang, Wenjie and Jiaying Pan, "Instant Messaging Insight", Computer Science Department, New York University, Nov. 22, 2000.
"X Window System: Getting Started", Stanford University, Oct. 26, 2000.
"JavaScript: MSIE 5 Unable to Print Child Window," Experts Exchange, posted Jun. 7, 2000.
Andrew Nosenko, "Scripting Support for Web Page Printing," Microsoft Corporation, Mar. 28, 2000.
Mark Day et al., "A Model for Presence and Instant Messaging", Network Working Group, Request for Comments 2778, The Internet Society, Feb. 2000.
"The Basics of Browser", Santa Clara County Office of Education Internet Institute (SCCOE), 1999.
Ramu Movva and William Lai, "MSN Messenger Service 1.0 Protocol," Internet Draft, Aug. 1999. (19 pages).
Randy Corke, "Keeping Data Warehouses Current: Automating Incremental Updates With Data Movement", DM Direct, May 1999.
Moran, Brian and Russ Whitney, "Getting to Know OLAP and MDX", Windows IT Pro, Instant Doc #5112, Apr. 1999.
Mark Handley et al., "SIP: Session Initiation Protocol", Network Working Group, Request for Comments 2543, The Internet Society, Mar. 1999.
"MQSeries link for R/3", International Business Machines Corporation, 1998.
Michael Tsai, "The Personal Computing Paradigm", ATPM Inc., 1998.
Arno Schoedl, "Issues for Implementing User Interface Software", Georgia Institute of Technology, Sep. 26, 1998.
Tristan Richardson and Kenneth R. Wood, "The RFB Protocol," ORL Cambridge, Jul. 16, 1998. (26 pages).
Allan Christian Long et al., "PDA and Gesture Use in Practice: Insights for Designers of Pen-based User Interfaces", University of California at Berkeley, 1997.
"Middleware—The Essential Component for Enterprise Client/Server Applications", International Systems Group, Inc., Feb. 1997.
Nicolas Pioch, "A Short IRC Primer", Jan. 1, 1997.
Constantine Stephanidis et al., "Design Representations and Development Support for User Interface Adaptation", Institute of Computer Science Foundation for Research and Technology, 1995.
Allen Gwinn, "Simple Network Paging Protocol—Version 3—Two-Way Enhanced," Network Working Group, Oct. 1995. (23 pages).
"An Introduction to Messaging and Queuing", IBM Corp, Jun. 1995.
"Relational OLAP: An Enterprise-Wide Data Delivery Architecture", Microstrategy, Incorporated, 1994.
Jarkko Oikarinen and Darren Reed, "Internet Relay Chat Protocol," Nerwork Working Group, May 1993. (58 pages).
"Guidelines for Implementing and Using the NBS Data", Federal Information Processing Standards, Publications 74, Apr. 1, 1981.
"ILOG Views 2D Graphics: The C++ Library for Interactive 2D Graphincs", ILOG.
"Sametime 3 Features and Benefits", IBM publication, date unknown (1 page).

* cited by examiner

METHOD AND APPARATUS FOR ARCHIVING DATA IN A RELATIONAL DATABASE SYSTEM

BACKGROUND OF THE INVENTION

The present invention relates to active data. More particularly, the present invention relates to methods and apparatus for efficiently updating and employing active data in for example business intelligence systems.

Relational databases have long been employed to archive mission-critical data. Relational databases offer reliable storage, with vendors supporting architectures that provide redundancy to ensure uninterrupted service and no loss of data. Relational databases also support the Structured Query Language (SQL) that allows user to store, retrieve and/or modify data in a relatively straight forward manner. Most Relational Database Management System (RDBMS) vendors also support the concept of triggers. A trigger may be thought of as a notification mechanism that is activated when data is changed in the database. Many user applications include the trigger feature, thereby making relational databases a popular choice for data archival among application developers.

Active data, however, poses a significant challenge for software developers, and particularly for relational database developers, due to the sheer volume of data involved. Active data may be defined as data that changes on short or regular interval. The duration of the interval may be as short as a millisecond, for example. The opposite of active data is static data: data that does not change on a regular basis or data that changes with long periodicity. Active data is also referred to as real-time data. Examples of active data may include, for example, the sales transactions in a store, the exchange rate of the US dollar versus other currencies like the Euro or the Canadian dollar, and the like.

The volume involved when dealing with active data can be daunting from both a historical perspective (i.e., the historical records of change in values represented by a variable) and a runtime perspective (i.e., updating the database to keep up with the pace of change). By way of example, consider a typical large company stock on a major trading board. The stock may be held by millions of customers, many of whom depend on the up-to-the-minute stock price data for their trading decisions. Thus, a change in the value of such a stock may require millions of updates to the portfolios of millions of customers per second.

Relational database developers have long relied on data normalization as a technique to optimize the task of updating data for short and frequent transactions, such as the task of updating the aforementioned change in a stock price. For these transactional or operational systems, the goal is to reduce the duplication of data among tables. Upon being normalized, the data of a database is isolated in a large number of tables, but a given data value is kept in only one or a few tables so that fewer tables will require updating when a change occurs.

Using the aforementioned stock price updating example, a relational database developer may normalize the data tables such that only one or two source tables need to be updated when the stock price changes. Using primary key-foreign key specifications, other tables (such as the millions of tables representing the portfolios of individual customers) may be provided with a reference to the appropriate field(s) in the source table(s). Accordingly, there is no need to update the millions of tables representing the portfolios of individual customers when the price of a stock changes, which could happen from second to second. The concepts of primary key and foreign key are extremely well known in the relational database art and will not be further explained here for brevity's sake.

Data normalization, however, vastly reduces the efficiency of another class of applications, known as business intelligence applications or systems. In business intelligence applications (which includes analytical applications and/or reporting applications for the purpose of the present disclosure), the database is employed as a support tool, or a data depository, to answer business questions (e.g., how many widgets were sold by stores A, B, and C on January 10th?). Since data normalization isolates data in a large number of tables to reduce data duplication among tables, such analysis requires traversing the multitudes of primary key-foreign key relationships of a normalized database in order to materialize the data in the various required data tables for analysis.

Such traversal unfortunately are complex and hence takes a large amount of time, and often detrimentally affects the performance of a business intelligence system. For analysts and decision makers who require real-time reporting and/or analysis of active data, the latency involved in traversing the normalized database may be intolerable since the reporting and/or analysis based on the normalized tables may not be able to keep up with the pace of change in the data values.

At the opposite extreme is the de-normalized approach, where the data of the database is put back into fewer tables after normalization to support querying and analysis. Although a given data item may be repeated in many different tables, the user application has to deal with fewer tables during querying and/or analysis, and performance is substantially improved. In addition, asking business questions are easier since the traversals are less complex. The de-normalized approach, however, works poorly with active data since updating is complicated by the fact that a large number of tables needs to be updated for each change in a given data item.

In view of the foregoing, there are desired improved techniques and arrangements for efficiently supporting both the large number of updates required by the active data and the real-time reporting and/or analysis based on the active data.

SUMMARY OF THE INVENTION

The invention relates, in one embodiment, to an arrangement for archiving data in a relational database. The arrangement includes a first table having a first data field. A value in the first data field is updated by a Relational Database Management System (RDBMS) associated with the relational database when there is a change in the value in the first data field. The arrangement further includes a second table having a second data field represented by a lookup function. The lookup function references the first data field. The lookup function acquiring the value in the first data field for use as a value of the second data field only when a value of the second data field is required by an application program that operates on the relational database.

The present invention teaches a method for archiving data in a relational database. The method includes providing a first table and updating a value in a first data field of the first table, using a Relational Database Management System (RDBMS) associated with the relational database, when there is a change in the value in the first data field. The method further includes providing a second table having a second data field represented by a lookup function. The lookup function references the first data field. The method additionally includes acquiring the value in the first data field for use as a value of the second data field only when a value of the second data field is required by an application program that operates on the relational database.

These and other features and advantages of the invention will be discussed in more detail in the following detailed description of the invention and in conjunction with the following figures.

BRIEF DESCRIPTION OF THE DRAWINGS

The invention is illustrated by way of example, and not by way of limitation, in the figures accompanying the drawings, and in which like reference numerals refer to similar elements, and in which.

DETAILED DESCRIPTION OF THE PREFERRED EMBODIMENTS

Figure 1:
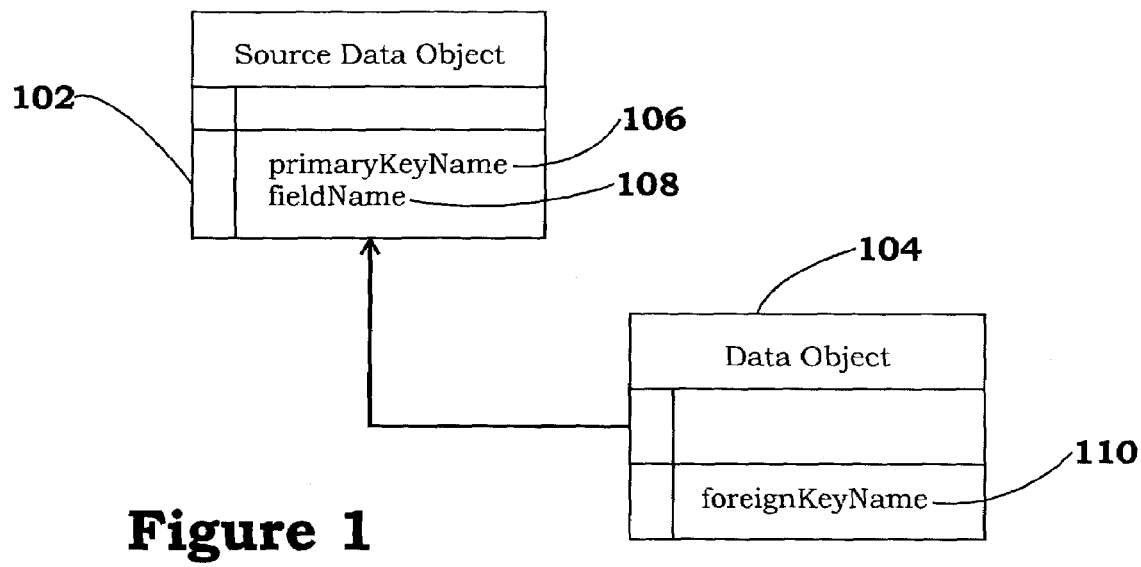
FIG. 1 shows, in accordance with one embodiment of the present invention, two data objects, one of which is a source data object and the other is a de-normalized data object containing a lookup function.

The invention will now be described in detail with reference to a few preferred embodiments, as illustrated in the accompanying drawings. In the following description, numerous specific details are set forth in order to provide a thorough understanding of the invention. It will be apparent, however, to one skilled in the art, that the invention may be practiced without some or all of these specific details. In other instances, well-known process steps and/or features have not been described in detail in order to not unnecessarily obscure the invention. The features and advantages of the invention may be better understood with reference to the drawings and discussions that follow.

In accordance with one embodiment of the present invention, there is provided an active lookup mechanism that enables the database to be optimized for updating transactions as well as for supporting querying/analysis. With active lookups, the values of the fields of a lookup column in a data object (such as a table) are given by the values of a column in another data object. Conceptually speaking, a lookup column in a table may be thought of as a function call performed in the context of a data object to lookup a single field in another data object (the foreign or source data object).

Although a lookup function may obtain multiple data values associated with multiple fields, for the purpose of the disclosure, it is easier to explain using an example wherein a lookup function is employed to obtain a single value from the source table. The example will be expanded to include the multiple data value lookup later herein.

When a change occurs in the value of a data item, for example, that change is updated into a field in one or more source tables, which are normalized for high performance and simplified maintenance. Other tables, which are de-normalized tables optimized for querying/analysis, contain active lookup functions that refer to the value in the source, normalized table.

These active lookup functions may be thought of as "virtual data" that need not get updated unless required by an application program that operates on the database. If the application program subscribes to a given lookup function to be notified when there is a change in the value represented by the lookup function, that lookup function will perform the lookup whenever it is notified of a change in the value stored in the source, normalized table.

Once the value is obtained by the lookup function, a trigger is activated to inform the application program that the value it subscribes to has changed. In this manner, the notification is cascaded in a transparent manner between the source, normalized table and the application program via the de-normalized table that contains the lookup function. The client application program needs not be aware of the fact that the data comes from a lookup instead of being acquired directly from the de-normalized table. Furthermore, the client application program needs not be aware that the data comes from tables that have been normalized for efficient updating.

Lookup functions are particularly efficient when the client application program requires access to only a subset of the data items available in a database. Since the lookup functions in the de-normalized data tables do not get activated unless subscribed to by an application program, effort is not wasted on acquiring and/or updating, in de-normalized tables, values which do not get utilized by a client application program.

Further, since certain data items may not get updated often enough to pose a performance problem, they may be populated directly in the de-normalized data tables. Using the previous stock portfolio example, the customer name or the customer address is a data item that is not expected to change frequently and may thus be populated directly into the de-normalized data table, alongside lookup functions that refer to the instantaneous price of a stock, which instantaneous price is populated in the normalized source table. The ability to employ both lookup and non-lookup data in a de-normalized table simplifies the task of developing database tables for developers since it reduces the number of lookup functions that must be created and improves performance since fewer computations are required to update the infrequently changed non-lookup data.

In this manner, lookups may be thought of as a hybrid solution that supports data normalization, thereby allowing data to be updated in fewer places. Lookups also supports data de-normalization, thereby facilitating efficient querying/analysis of the data in one data object. As such, lookups are particularly useful in cases where active data is involved since they allow the voluminous number of updates associated with active data to be handled efficiently via the normalized table. At the same time, the efficient querying/analysis capability provided by the de-normalized tables that contain the lookup functions allows the client application to provide real time reporting and/or analysis of the active data to the user. Note that the term "real-time" as employed herein, refers to the substantially or nearly contemporaneous nature of the task to be performed. In the real world, computer code, electrons and circuits involve non-zero delays to accomplish their tasks and thus it is not intended herein that the term represent the concept of zero delay.

The features and advantages of the present invention may be better understood with reference to the figures and discussions that follow. FIG. 1 shows, in accordance with one embodiment of the present invention, two data objects: a source data object 102 and a de-normalized data object 104. Source data object 102 may be thought of as one of the normalized tables optimized for updating transactional data. Source data object 102 is shown having a primaryKeyName 106 and a fieldName 108. These are referred to by the foreignKeyName 110 in data object 104.

Conceptually, the lookup may be represented by the following generic function expression.

Lookup(foreignKeyName, dataObjectName, primaryKeyName, fieldName), where foreignKeyName represents the name of the field in the current data object that contains a key to the foreign or source data object (dataObjectName);

dataObjectName represents the name of the source data object;

primaryKeyName represents the name of the primary key in the source data object (dataObjectName); and fieldName represents the name of the field (column) from the source data object to be returned as a result of the lookup function.

Figure 2:
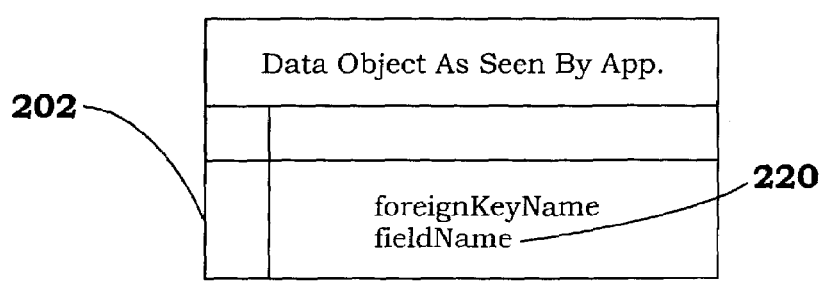
FIG. 2 shows, in accordance with one embodiment of the present invention, a view of the de-normalized data object of FIG. 1 as seen by the client application program that has subscribed to its lookup function.

FIG. 2 shows a data object 202, representing the data object 104 as seen by the client application program that has subscribed to the lookup function of the example of FIG. 1. As mentioned, the client application program needs not be aware of the fact that the data comes from a lookup instead of being acquired directly from the de-normalized table and needs not be aware that the data comes from tables that have been normalized for efficient updating. In other words, as far as the client application program is concerned, the data and the change notification thereof appear to come directly from the de-normalized data object 104 itself despite the fact that the notification is cascaded from source data object 102 and the data itself is obtained by a function call from data object 104 to data object 102.

Note that the keys can be composite keys (i.e., comprises multiple fields). Further, the fieldname 220 can return multiple fields. However, it is important to note that the data associated with lookup functions is not materialized and is not acquired unless the lookup functions are activated by the client application program. Further, the de-normalized table may also contain a mixture of lookup functions and non-lookup (i.e., directly populated and/or updated) data as mentioned earlier.

Figure 3:
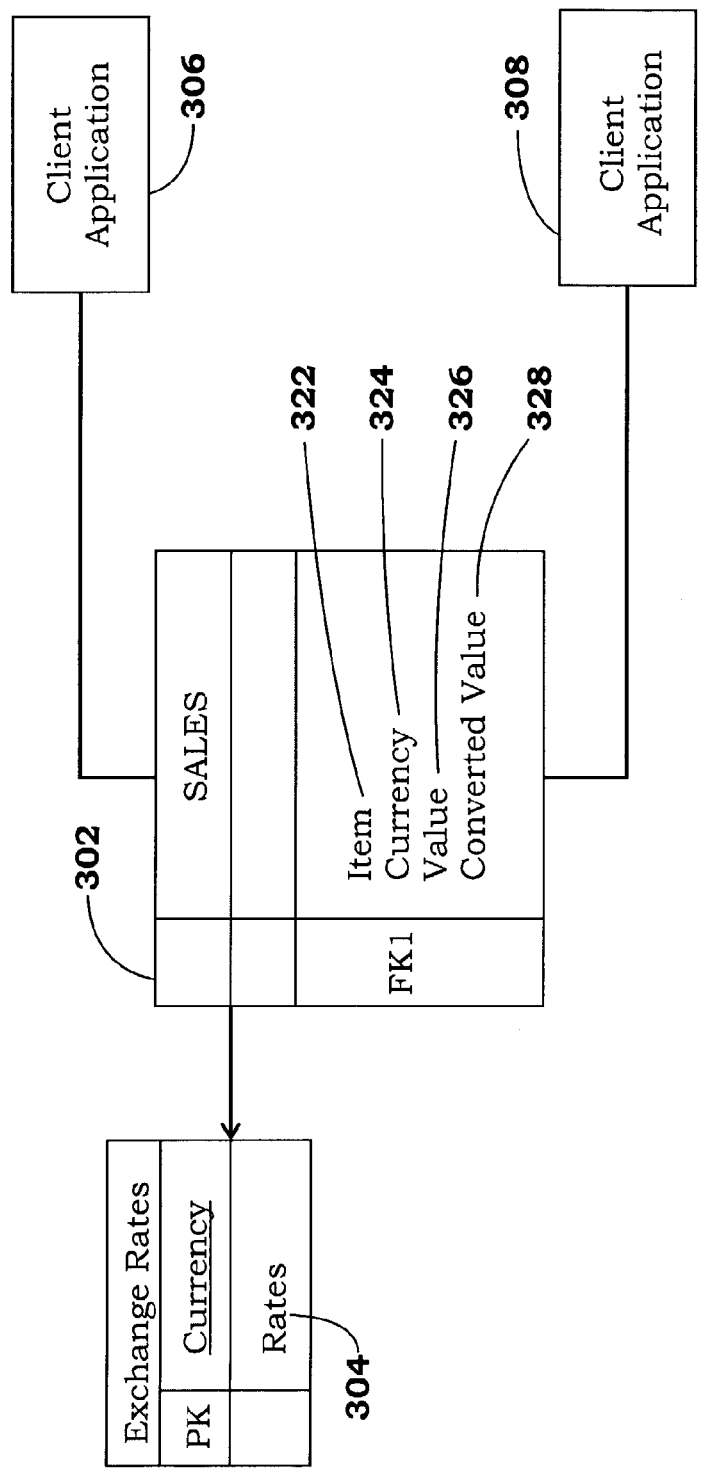
FIG. 3 illustrates, in accordance with one embodiment of the present invention, an example of how a lookup function may be employed in a retail scenario.

FIG. 3 illustrates an example of the lookup function usage in a retail scenario. In this case, sales of an item (Item 322) for certain price (Value 326) in the local currency (Currency 324) is stored in Sales table 302. A lookup function associated with Sales table 302 refers to the exchange rate stored in a source table ExchangeRates 304, which exchange rate is updated continuously in ExchangeRates table 304 as the exchange rate fluctuates. The Converted Value 328 is stored in Sales table 302

The following calculation is made in a column of Sales table 302.

Sales.ConvertedValue=Sales.Value*Lookup(Currency, ExchangeRates.Rate).

If the lookup function is activated to by a client application program 306, a modification in the exchange rate in ExchangeRates table 304 will automatically propagate to the SalesTable 302 where the ConvertedValue 328 is recalculated and propagated to the client application 306 and any other appropriate client application 308 as shown in FIG. 3.

As can be appreciated from the foregoing, the use of lookup functions accommodates the need to efficiently update the large volume of data associated with active data as well as the need to efficiently query and/or analyze the data. Lookup functions accomplish the former by supporting data normalization, allowing the data to be updated in isolated source tables. Lookup functions also accomplish the latter by supporting data de-normalization. However, since a lookup is not performed unless it is activated or subscribed to by a client application program, the number of lookups tend to be substantially less than the number of data items available in the database since a typical client application usually requires only a small subset of the data items available in the database. Accordingly, effort is not wasted on updating and/or acquiring data items which do not get utilized, rendering it possible to efficiently perform real-time analysis on real time data.

While the invention has been described in terms of several preferred embodiments, there are alterations, permutations, and equivalents which fall within the scope of this invention. For example, although the active lookup feature is discussed to be particularly useful with active data, such feature is also useful for archiving any data that changes frequently even though the periodicity of the change may not qualify such data, to some people, as "active data." It is therefore intended that the following appended claims be interpreted as including all such alterations, permutations, and equivalents as fall within the true spirit and scope of the invention.

What is claimed is:

1. A computer implemented system for archiving data in a relational database, comprising:
    a first table having a first data field, a value in said first data field being updated by a Relational Database Management System (RDBMS) associated with said relational database when there is a change in said value in said first data field wherein said first table represents a normalized table optimized for updating transactional data; and
    a second table having a second data field represented by a lookup function, said lookup function references said first data field, said lookup function acquiring said value in said first data field for use as a value of said second data field only when a value of said second data field is required by an application program that operates on said relational database wherein said second table represents a de-normalized table optimized for real-time querying using said application program.

2. The computer implemented system of claim 1 wherein said second table further includes a third data field, a value in said third data field being updated by said Relational Database Management System (RDBMS) associated with said relational database when there is a change in said value in said third data field.

3. The computer implemented system of claim 1 wherein said first data field is configured to store active data.

4. The computer implemented system of claim 1 wherein said application program represents a business intelligence program that provides real-time reporting of said active data.

5. The computer implemented system of claim 1 wherein said lookup function is activated when said application program subscribes to said lookup function.

6. A computer implemented method for archiving data in a relational database, comprising:
    providing a first table;
    updating a value in a first data field of said first table, using a Relational Database Management System (RDBMS) associated with said relational database, when there is a change in said value in said first data field wherein said first table represents a normalized table optimized for updating transactional data;

providing a second table having a second data field represented by a lookup function, said lookup function references said first data field wherein said second table represents a de-normalized table optimized for real-time querying using said application program; and acquiring said value in said first data field for use as a value of said second data field only when a value of said second data field is required by an application program that operates on said relational database.

7. The computer implemented method of claim 6 wherein said second table further includes a third data field, a value in said third data field being updated by said Relational Database Management System (RDBMS) associated with said relational database when there is a change in said value in said third data field.

8. The computer implemented method of claim 6 wherein said first data field is configured to store active data.

9. The computer implemented method of claim 6 wherein said application program represents a business intelligence program that provides real-time reporting of said active data.

10. The computer implemented system of claim 6 wherein said lookup function is activated when said application program subscribes to said lookup function.

* * * * *